UNITED STATES PATENT OFFICE.

LOUIS COLLARDON, OF LEIPSIC, GERMANY.

MANUFACTURE OF PLASTIC MASSES FROM CASEIN, &c.

No. 830,493.

Specification of Letters Patent.

Patented Sept. 11, 1906.

Application filed November 22, 1905. Serial No. 288,611.

*To all whom it may concern:*

Be it known that I, LOUIS COLLARDON, retired military officer, manufacturer, a citizen of Argentina, residing at 32 Friedrich Liststrasse, Leipsic, Kingdom of Saxony, German Empire, have invented new and useful Improvements in the Manufacture of Plastic Masses from Casein and the Like, of which the following is a specification.

The present invention has for its object the manufacture of plastic masses from casein, these masses being characterized by their hardness.

The material in accordance with the present invention is far less combustible than celluloid and the like, is likewise distinguished by its resistance to water, and is readily manufactured and worked.

The present process consists in mixing casein with cellulose esters, such as viscose (cellulose xanthogenate) or with cellulose esters of organic acids. When the cellulose ester can be readily converted into cellulose or hydrocellulose, as is the case with cellulose xanthogenate, the added cellulose ester is converted into cellulose or hydrocellulose.

In using cellulose xanthogenate the procedure may be as follows: A highly concentrated viscose solution is prepared (preferably a twenty per cent. solution) and casein is mixed therewith, the casein being preferably insoluble or undissolved. In the first place as little casein as possible is added, so that a pasty mass is formed, and the mixture is treated in a kneading or like apparatus. The temperature should be about 50° to 60°. More casein is then gradually added, and the mass is again worked up. The addition of casein is proceeded with so long as the kneading appliances are able to pass through the mass. During this kneading an increase of temperature takes place spontaneously, especially when the raw viscose solution employed is of alkaline reaction. This rise of temperature may also be increased by a supply of heat. The kneaded mass is formed into plates or the like by means of rollers, hydraulic presses, or other appropriate means and then heated to 100° or more, by which means the decomposition of the viscose, which had already begun during the mixing, is completed and at the same time drying takes place. Substances may also be added to the casein which decompose the casein and either assist the employment of heat or render it superfluous. For instance, metallic chlorids and sulfates have shown themselves to be adapted for this.

In employing raw viscose the presence of the alkalies is advantageous. Refined viscose may, however, be used, small additions of alkalies being made thereto, if necessary. Similar additions may be made to the casein likewise.

The casein may be used dry or with a medium which moistens and swells the surface of the casein. For this purpose alkaline media, such as inorganic or organic bases, and likewise substances of acid reaction may be employed. Alcohols which will not too readily volatilize at the temperature employed may also be used.

The process furnishes a completely homogeneous transparent mass, which is hard, but nevertheless plastic. The cost of manufacture is exceedingly low.

Filling materials, such as dextrine and the like, may be employed as admixtures with the casein. Hardening or setting media—such as formaldehyde, hexamethyletramine, and the like—may be added to the casein either before or during the working-up process. A superficial hardening may also be effected after the working up.

In place of viscose other thiocelluloses or hydrothiocelluloses may be employed. The thiocellulose or hydrothiocellulose may be used in aqueous and also in other solution.

Plastic masses may likewise be formed of casein, caseinates, albumens, and albuminous substances, with the employment of acid esters of cellulose, hydrocellulose or the like, (with the exception of esters of nitric acid.) Cellulose or hydrocellulose esters (oxycellulose esters) of the fatty acids are chiefly employed. Esters adapted for the present purpose are, for example, cellulose acetate, cellulose butyrate, cellulose aceto-butyrate, cellulose palmitate, cellulose phenylacetate, and the like.

The cellulose esters present the property of being soluble in those solvents which at the same time present a certain capacity for dissolving casein, caseinates, and albumens. Owing to this it is possible to effect the mixing of the various substances with the employment of one solvent. At the same time the admixture of casein to the cellulose ester and to the solvent for the same causes the cellulose esters to assume a certain hardness and elasticity. If the esters were mixed with the solvent without the admixture of casein and the like, complete mixing would take place under heat and pressure, but adequate setting of the mass could only be attained by the removal of the solvent, for which a considerable time is required. With the present process setting takes place speedily, which is apparently attributable to the fact that the casein absorbs and neutralizes the solvent.

The following substances or their solutions may be cited as solvents adapted for the present process: chloroform, chloral hydrate, pyridin, hydroxylamin, anilin, methylanilin, dimethylanilin, formic-acid ester, salicylic-acid ester, esters of glycose sugars, lactose, lævulose, saccharose, and the like, also aceto-chlorhydrose, glycose dibutyrate, glycose distearate, glycose ditartrate, glycose tetratartrate, glycose diacetate, glycose triacetate, glycose pentacetate, octacetylic glycose, pentacetyl lævulose, saccharo monoacetate, saccharo tetracetate, saccharo heptacetate, saccharo octacetate, also the halogen esters of glycerin, such as monoacetate chlorhydrin, dichlorhydrin or acid esters, such as sebacine, phosphoric acid, benzoic acid, and others.

The process may be carried into practice in the following manner: One part of dry cellulose acetate is mixed with the like quantity of epichlorhydrin and kneaded or worked up in a mixing and kneading apparatus or in a rolling mechanism until an extremely tenacious elastic mass is formed. Finely-powdered casein is then added until the mass becomes transparent when mixed together. The quantity of casein added is determined practically in accordance with the degree of hardness desired. The more casein added the harder the mass becomes. If, for example, as much casein is added as there is cellulose ester present, a very soft elastic mass is obtained. By increasing the quantity of casein added, for example, to four times the quantity of the cellulose ester the hardness is augmented. During mixing heating is preferably effected also, say, to 40° to 50° centigrade. Pressure may be employed simultaneously.

A material for setting the casein may also be employed, this material being mixed with the casein so that hardening is produced throughout. Hexamethylic tetramin, for example, is adapted for this purpose, particularly when an acid solvent is used, the separation of the hardening formaldehyde *in statu nascendi* being facilitated.

In place of casein other albumens and albuminous substances which behave in the same or a similar manner as casein toward solvents may be employed. Seralbumen and vegetable albumen may also be used. For example, earth nut-cake has proved suitable.

The cellulose esters may either be employed separately or mixed together—for instance, cellulose acetate may be used mixed with cellulose palmitate. Further, instead of a single solvent a mixture of a number of solvents may be utilized. The characteristic feature common to these solvents should, however, be that the mixture will dissolve both the cellulose esters and casein and albumen.

The casein is not completely dissolved in the process. On the contrary only such solvents are employed and in such quantities that a superficial solution or swelling of the casein takes place without the total quantity of casein present being completely dissolved.

Cellulose xanthogenate and the like may also be mixed and worked up with the cellulose esters. Pigments and coloring-matters and also inorganic or organic filling materials may also be added to the plastic mass.

The process permits of the formation of both transparent and opaque masses.

What I claim as my invention, and desire to secure by Letters Patent, is—

1. The process of manufacturing plastic masses, which consists in mixing casein with cellulose esters of organic acids.

2. The process of manufacturing plastic masses, which consists in mixing casein with cellulose esters of organic acids and hardening the casein.

3. The process of manufacturing plastic masses, which consists in mixing casein with cellulose esters of organic acids and liberating cellulose from the said esters.

4. The process of manufacturing plastic masses, which consists in mixing casein with cellulose esters of organic acids and organic substances dissolving the said cellulose esters.

In testimony whereof I have signed my name to this specification in the presence of two subscribing witnesses.

LOUIS COLLARDON.

Witnesses:
SOUTHARD P. WARNER,
RUDOLPH FRICKE.